June 11, 1940.   C. G. ALLGRUNN   2,204,099
DUSTING APPARATUS
Filed Jan. 21, 1938   3 Sheets-Sheet 1
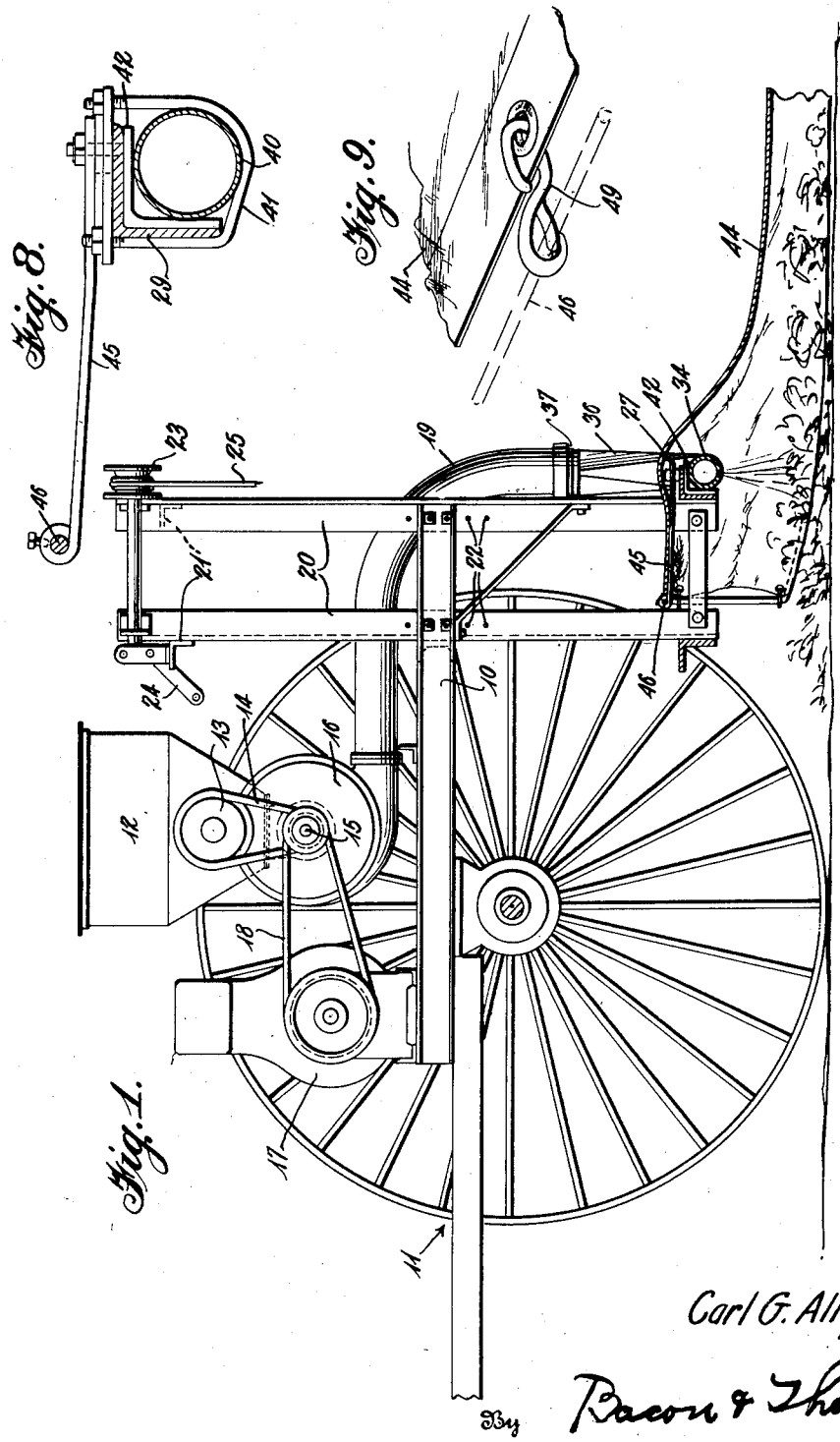
Inventor
Carl G. Allgrunn
By Bacon & Thomas
Attorneys June 11, 1940.  C. G. ALLGRUNN  2,204,099
DUSTING APPARATUS
Filed Jan. 21, 1938  3 Sheets-Sheet 2
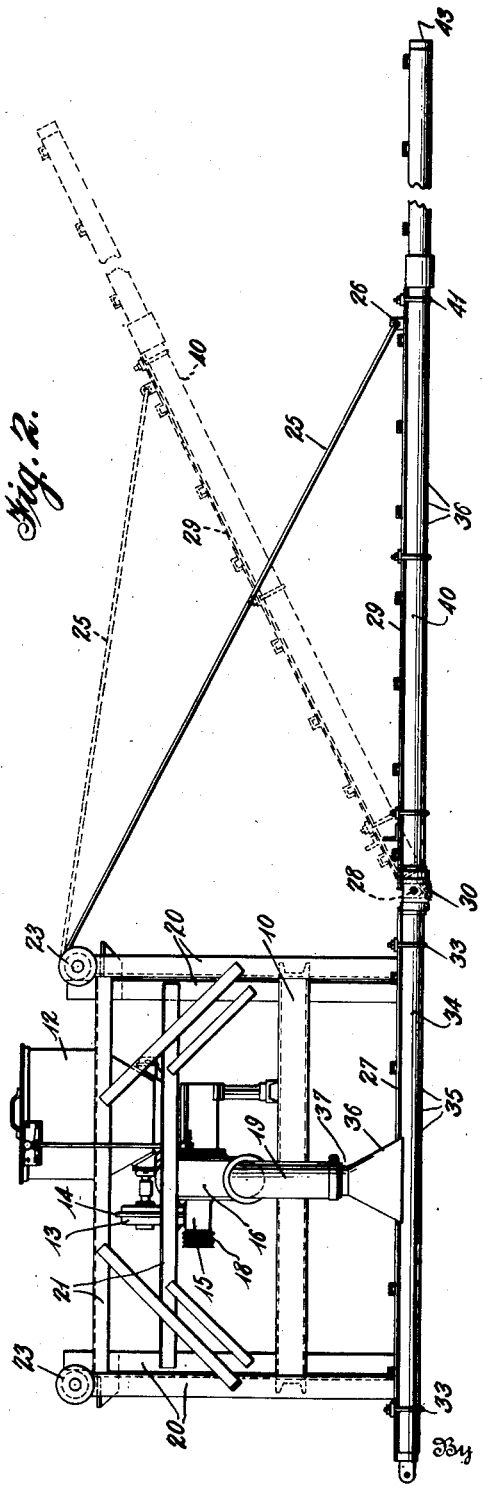
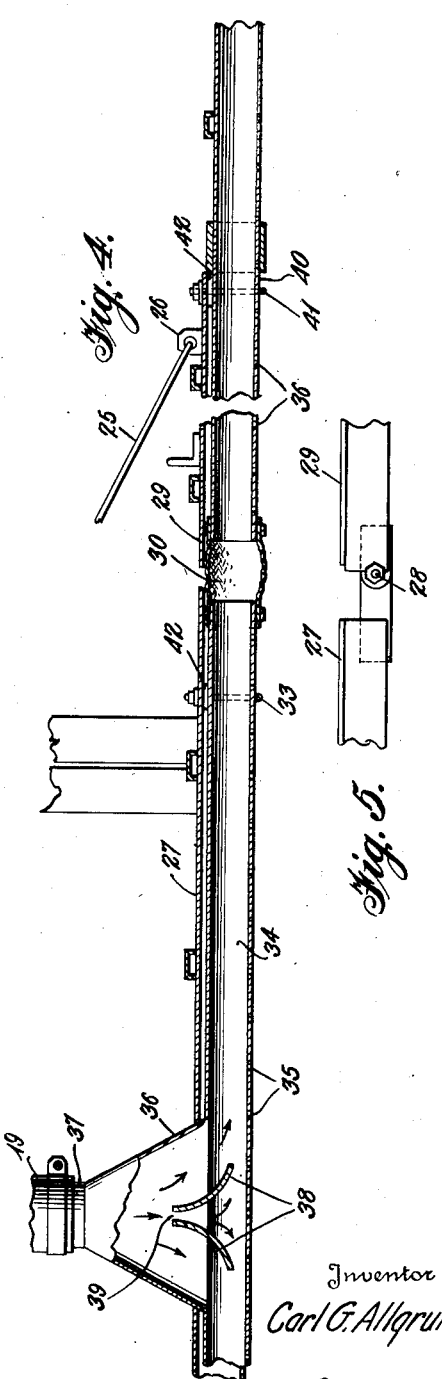
Inventor
Carl G. Allgrunn
By Bacon & Thomas
Attorneys June 11, 1940.  C. G. ALLGRUNN  2,204,099
DUSTING APPARATUS
Filed Jan. 21, 1938   3 Sheets-Sheet 3
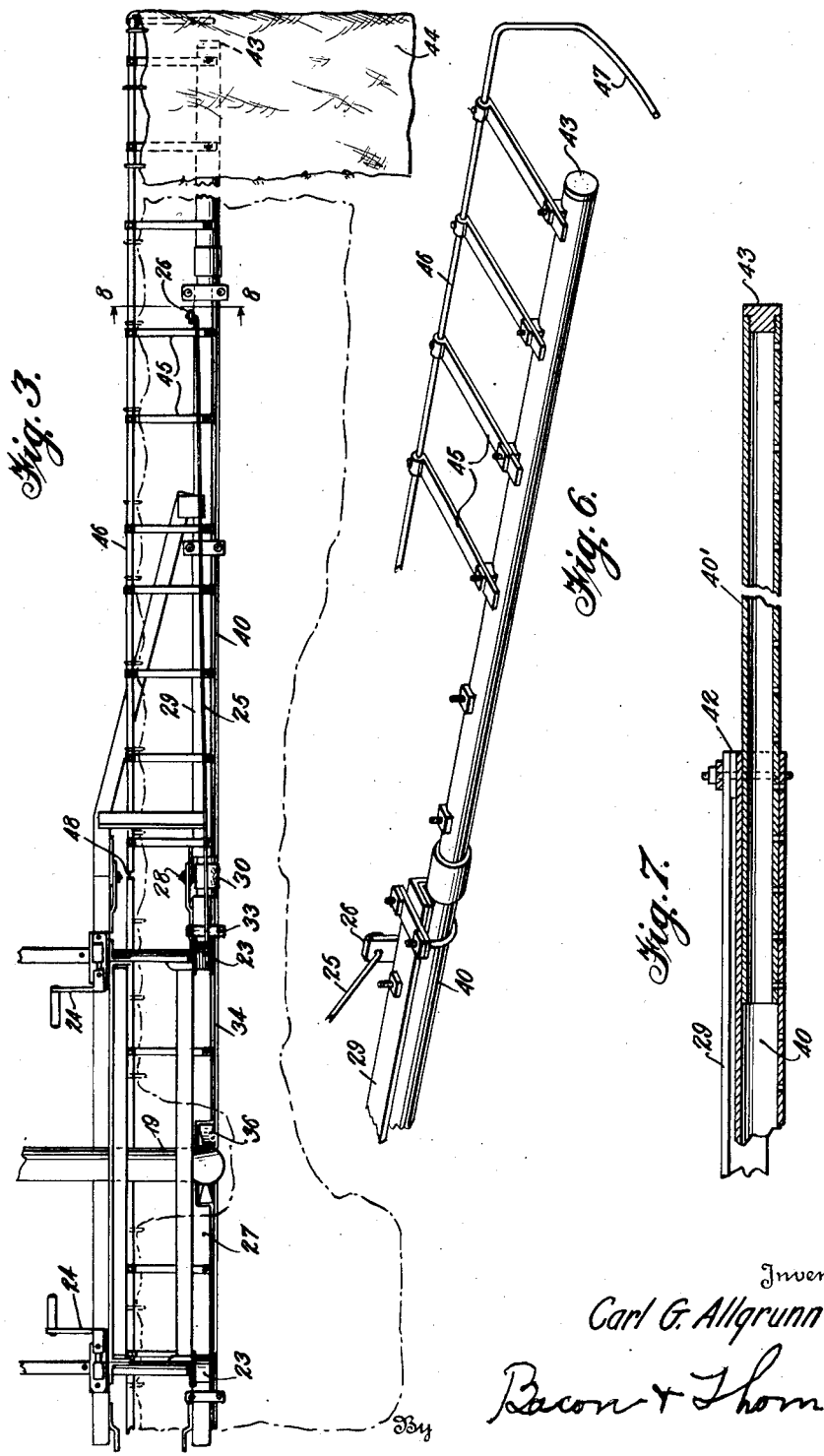
Inventor
Carl G. Allgrunn
By Bacon + Thomas
Attorneys Patented June 11, 1940

2,204,099

UNITED STATES PATENT OFFICE 2,204,099

DUSTING APPARATUS

Carl G. Allgrunn, Middleport, N. Y., assignor to "Friend" Manufacturing Company, Gasport, N. Y., a corporation of New York Application January 21, 1938, Serial No. 186,212

4 Claims. (Cl. 43—148)

This invention relates to new and useful improvements in apparatus for dusting an insecticide on comparatively low growing plants, and further relates to an improved method for destroying insects on plants.

The primary object of this invention is to provide apparatus by means of which insecticides, in the form of dust, may be distributed from an ambulatory source of supply onto plants and confined a sufficient time to permit the insecticides to destroy the insects on the plants being treated.

A further object of the invention is to provide a novel form of insecticide dusting apparatus which may be used for rapidly and inexpensively dusting large areas.

A still further object of the invention is to provide an insecticide dusting apparatus which, when in operative condition, will treat a comparatively wide area, but which may be folded or collapsed to enable the apparatus to be moved through comparatively narrow spaces, such as through gate openings in fences, barn or shed doors, or the like.

A still further object of the invention is to provide an insecticide dusting apparatus having distributing booms which may be adjusted relative to the ground and relative to each other whereby areas of variable heights and widths may be treated.

A still further object of the invention is to provide a method by means of which an insecticide may be distributed from an ambulatory source of supply and confined on the plants being treated a sufficient length of time to enable the insecticide to liberate poison which will accomplish the destruction of insects on the plants being treated.

Other objects and advantages of the invention will be apparent during the course of the following description.

In the accompanying drawings forming a part of this specification and in which like numerals are employed to designate like parts throughout the same:

Fig. 1 is a side elevational view of a dusting apparatus employing this invention and showing the discharge boom in vertical section, Fig. 2 is a rear elevational view of the dusting apparatus with a curtain which may be used therewith removed to better illustrate the distributing mechanism of the apparatus, Fig. 3 is a plan view showing a curtain associated therewith, Fig. 4 is a vertical sectional view of a portion of the distributing apparatus, Fig. 5 is a detail elevational view of the hinge shown in Figs. 2 and 3, Fig. 6 is a perspective view of a portion of the distributing apparatus showing a curtain supporting means, Fig. 7 is a vertical sectional view of a modified form of tubular distributing boom, Fig. 8 is an enlarged sectional view taken along line 8—8 of Fig. 3, and Fig. 9 is a detail perspective view illustrating mechanism for detachably connecting the curtain to its support.

In the drawings, wherein for the purpose of illustration is shown a preferred embodiment of this invention, and referring particularly to Fig. 1, the reference character 10 designates a base or platform employed for supporting the dusting apparatus as a unit. This base is intended to be removably secured, in any desired manner, to a wheeled carriage which is designated in its entirety by the reference character 11. This wheeled carriage may be especially designed to receive the base or platform 10 or it may take the form of any conventional motor vehicle or horse-drawn vehicle.

Mounted upon the base or platform 10 is a hopper 12 which receives the insecticide composition. A suitable form of mixing and feeding mechanism, not shown in detail, is provided for the hopper 12 and is driven by the pulley 13 over which is trained a belt, or the like, 14 which is driven by the shaft 15 of a blower device 16. The blower shaft 15 is driven by any suitable form of prime mover 17 through the medium of the belt 18. A flexible discharge tube 19 extends from the blower 16, as illustrated. It will be understood that the hopper, the blower, and the prime mover in themselves do not form a part of this invention, but are intended to be illustrative of any conventional form of power operated supply means for an insecticide duster.

Suitably secured to the rear of the base or platform 10 are two pairs of vertically extending angle irons 20 which are spaced relative to each other and are braced at their upper ends by the arms 21. These angle irons are each provided with series of longitudinally spaced apertures 22 adapted for receiving bolts, or the like, by means of which the distributing mechanism of the dusting apparatus may be vertically adjustably connected to the platform 10.

Suitably secured to the lower ends of the vertically extending angle irons 20 is a horizontally extending angle iron member 27. This angle iron 27 constitutes the intermediate portion of the frame of a dust distributing boom. Pivotally connected to the outer ends of this intermediate frame member 27, as by means of the hinge 28, are the outer boom frame sections 29 which are of angular formation in section.

The outer boom frame sections 29 are adapted to be vertically raised and lowered to reduce the over-all width of the distributing boom frame and for this purpose worm geared hoisting drums 23 or the like are mounted upon the base 10 preferably at the upper ends of the upright angle irons 20. The drums 23 may be operated manually as by the cranks 24 or otherwise powered in any suitable manner, and carry cables 25 which are secured to the frame sections 29 as by the lugs 26.

The intermediate section 27 of the boom frame has secured thereto, as by means of the U-bolts 33, a tube section 34 which is provided with a longitudinally arranged series of dust discharging apertures 35. These apertures are directed downwardly with respect to the tube. The intermediate portion of this tube 34 is provided with an upstanding, funnel-shaped supply connection 36 which is detachably connected at its reduced throat portion 37 to the outer extremity of the flexible hose 19 which extends from the discharge of the blower 16, as previously explained. Positioned within the funnel-shaped supply connection 36 are a pair of oppositely curved deflector plates 38 which function to distribute the insecticide dust in opposite directions or longitudinally of the distributing tube section 34. The upper ends of these deflector plates are spaced slightly at 39 to permit some of the insecticide to be distributed to the apertures 35 arranged in alignment with the throat 37 of the funnel connection 36.

Pivotally connected to the opposite ends of the intermediate tube section 34, as by means of a flexible coupling or the like 30, are end tube sections 40. These outer tube sections 40 are provided with insecticide dust discharge apertures 35 in the manner best illustrated in Fig. 5, and are connected to the boom frame sections 29 by means of U-bolts 41.

In the modified arrangement illustrated in Fig. 7, the tube sections 40 may be provided with telescoping extensions 40' whereby the dust distributing area may be increased.

Spacer blocks 42 are provided for each of the U-bolts 33 and 41 and are interposed between the frame sections 27 and 29 and the tube sections 34 and 40 in a manner to permit the various tube sections to be rigidly connected to the boom frame in axial alignment with each other. The outer extremities of the tube sections 40 are closed by readily removable caps or plugs 43. By removing these caps or plugs, a suitable plunger, or the like, may be passed through the assembled sections of tubes 34 and 40 to accomplish cleaning of the same.

From the foregoing, it will be readily apparent that the dust distributing boom is capable of a wide range of adjustment. The entire boom, comprising the intermediate tube section 34 and the outer tube sections 40, may be fixed in any predetermined position relative to the ground or the plants being treated by supporting the angle irons 20 on the platform 10 by passing bolts or the like through selective sets of apertures 22 provided on the angle irons 20. Either or both of the end tube sections 40 may be raised or lowered by means of the hoists 23 and cables 25 which operate to swing the frame section 29 and the tube sections 40 on hinges 28 and flexible tubular couplings 30, respectively, whereby the boom may be folded to enable the apparatus to be moved through comparatively narrow spaces such as through gate openings in fences, barn or shed doors, or the like or, if desired, either or both of the outer tube sections may be held in any predetermined raised position while the dust or other insecticide material is being discharged therefrom. Further, it will be apparent that the hinges or pivotal connections 28 operate to connect the boom frame sections 27 and 29 independently of the adjacent flexible coupling 30 whereby to entirely relieve the coupling of supporting stress.

A curtain 44 made of proper weight fabric is intended to be trailed or drawn in back of the distributing boom portion of this dusting apparatus during the time insecticides are being discharged from the tube sections 34 and 40. This curtain preferably is to be slightly wider than the over-all width of the distributing boom and should extend approximately 100 feet rearwardly of the distributing boom.

For the purpose of readily attaching this curtain 44 to the distributing boom, the various U-bolts 33 and 41 are employed for clamping to the boom frame sections 27 and 29 the forwardly extending arms 45. Fig. 6 discloses in detail the manner of attaching one of these arms 45 to the distributing boom. Attached in any desired manner to the extremities of the arms 45 is a curtain rod 46. This curtain rod, as best illustrated in Fig. 6, is bent at its opposite ends into depending, angular feet 47. This rod may be broken or formed into sections at the points 48 in any desired manner so that the curtain rod may be folded with the outer boom frame sections 29. Figs. 1 and 3 illustrate these curtain supporting arms 45 as extending forwardly of the distributing boom. The curtain 44 is detachably connected to the curtain rod 46, at desired intervals, by means of the clips 49. Suitable apertures, slots, or the like, may be provided in the curtain 44 at necessary points to permit of passage therethrough of the various frame portions of the distributing apparatus.

The preferred form of insecticide dust to be used with this dusting apparatus is a 4% mixture of nicotine and hydrated lime. This dust mixture, is applied at a temperature of 65° F. or over and confined for a short period in contact with the insects on the leaves and stalks of the plants being treated, will liberate a poison which will kill the insects on the plants. The distributing of this form of insecticide mixture from an ambulatory source of supply and the confining of the insecticide on the plants for a period long enough to permit the insecticide to liberate an insect killing poison by means of the curtain trailed in back of the distributing boom, is believed to constitute a very efficient and novel method of destroying insects.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. An insecticide dust distributing boom comprising, a sectional boom frame, means for hingedly connecting sections of the boom frame, a sectional apertured distributing tube carried by the boom frame sections and flexible coupling connecting means for sections of the distributing tube disposed adjacent said hinge means so that a predetermined boom frame section and the tube section supported thereby may be raised or lowered as a unit the said hinge means operating to connect said boom frame sections independently of the adjacent flexible coupling whereby to entirely relieve the coupling of supporting stress.

2. In an insecticide dusting apparatus, a base, an upright frame mounted on said base for adjustment in a vertical direction, pivotally connected angle irons forming boom frame sections, one of said sections being carried by said frame and another of said sections being swingable relative to said frame, and an apertured distributing tube section for each of said boom frame sections and supported in the angle thereof, said tube sections being flexibly coupled endwise adjacent said pivotal connection so that said swingable boom frame section and the tube section supported thereby may be raised or lowered as a unit, the said pivotal connection operating to connect the boom frame sections independently of the adjacent flexible coupling whereby to entirely relieve the coupling of supporting stress.

3. An insecticide dust distributing boom comprising, pivotally connected angle irons forming boom frame sections, and an apertured distributing tube section for each of said boom frame sections and supported in the angle thereof, said tube sections being flexibly coupled endwise adjacent said pivotal connection so that a predetermined boom frame section and the tube section supported thereby are movable as a unit, the said pivotal connection operating to connect said boom frame sections independently of the adjacent flexible coupling whereby to entirely relieve the coupling of supporting stress.

4. In an insecticide dusting apparatus, a base, an upright frame adjustably mounted on said base in a vertical direction, pivotally connected boom frame sections, one of said sections being carried by said frame and another of said sections being swingable relative to said frame, and an apertured distributing tube section for each of said boom frame sections and supported thereby, said tube sections being flexibly coupled endwise adjacent said pivotal connection so that said swingable boom frame section and the tube section supported thereby are movable as a unit, the said pivotal connection operating to connect the boom frame sections independently of the adjacent flexible coupling whereby to entirely relieve the coupling of supporting stress.

CARL G. ALLGRUNN.